No. 874,529. PATENTED DEC. 24, 1907.
H. NIEBUHR.
DEVICE FOR TRANSFORMING VARIABLE MOTIONS INTO UNIFORM MOTIONS.
APPLICATION FILED MAR. 19, 1907.
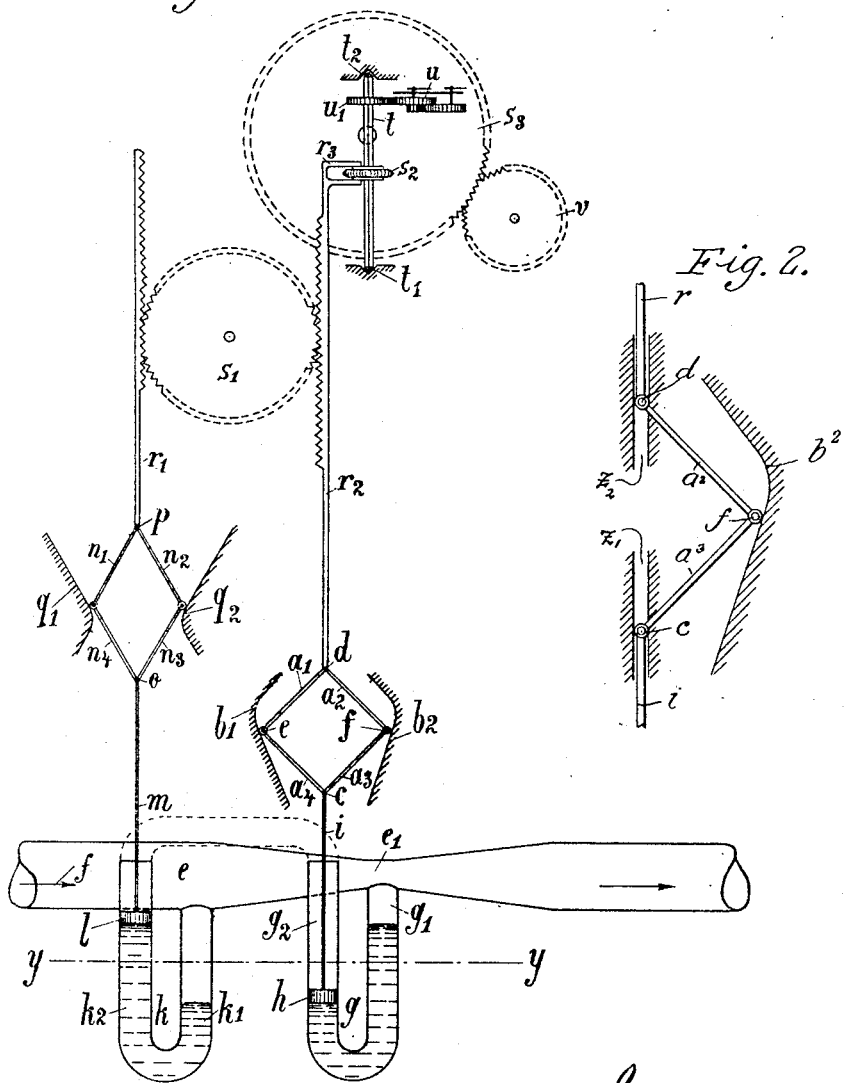

UNITED STATES PATENT OFFICE.

HENRI NIEBUHR, OF HANOVER, GERMANY, ASSIGNOR TO SIEMENS & HALSKE AKTIENGESELLSCHAFT, OF BERLIN, GERMANY.

DEVICE FOR TRANSFORMING VARIABLE MOTIONS INTO UNIFORM MOTIONS.

No. 874,529.     Specification of Letters Patent.     Patented Dec. 24, 1907.

Application filed March 19, 1907. Serial No. 363,275.

*To all whom it may concern:*

Be it known that I, HENRI NIEBUHR, a subject of the King of Prussia, German Empire, and resident of Hanover, Germany, have invented new and useful Improvements in Devices for Transforming Variable Motions into Uniform Motions, of which the following is a full, clear, and exact description.

My invention relates to a device for transforming a motion variable according to any mathematical law into a uniform motion and for registering the latter. For this purpose a motion transformer is used which contains a link joint, to one point of which the variable motion to be transformed is imparted. The transformer is of such a construction that a second point of the link joint will execute a uniform motion which is a function of the said variable motion.

My new device may be used especially for measuring purposes and can be employed in connection with gas- and water-meters, electrical and speed meters, in the latter case by simultaneously registering the time, the speed and the whole space described.

In the accompanying drawing I have illustrated in Figure 1 my invention as employed in connection with a water meter working on the principle of Venturi. Fig. 2 is a modification of the link system shown in Fig. 1.

In the drawing the transformer which has to transform a variable motion into a uniform motion is composed of a quadrangular link joint $a_1$, $a_2$, $a_3$, $a_4$, and two guides $b_1$, $b_2$ which latter are so shaped, that if the variable motion is imparted to the point $c$ of the link joint, the opposite point $d$ of the same will produce a linear motion which is a function of said imparted variable motion. If the mathematical function of the variable motion is known, the required shape of the curved guides $b_1$ and $b_2$ by which the link points $e$ and $f$ are guided can be exactly calculated.

In the drawing $e$ is a water pipe through which the water will flow in the direction of the arrow $f$. $c_1$ is a restricted portion in this pipe. $g$ is a tube having two shanks $g_1$ and $g_2$ and containing a suitable liquid for instance mercury. The shank $g_1$ is opening into the restricted portion $e_1$ of the pipe $e$. Upon the mercury level of the shank $g_2$ rests a piston $h$ which is rigidly connected to the point $c$ of the motion transformer by means of the rod $i$. A short distance before the restriction $e_1$ of the pipe $e$ a second tube $k$ is arranged the shank $k_1$ of which opens into the pipe $e$, whereby the mercury level in the second shank $k_2$ and the position of the piston $l$ is influenced. This piston is rigidly connected by the rod $m$ to the point $o$ of a second motion transformer composed of the quadrangular link joint $n_1$, $n_2$, $n_3$, $n_4$ and the curved guides $q_1$, $q_2$. The second motion transformer is similar to that above described, the variable motion imparted to the motion transformer at $o$ being so transformed, that the opposite point $p$ of the transformer link joint will produce a uniform motion. Both transformers are so constructed that the uniform motion of $d$ is equal to that of $p$.

The uniform motion of the link points $d$ and $p$ are transferred by means of toothed rods $r_1$ and $r_2$ upon the tooth wheel $s_1$. The rod $r_2$ is provided at its upper end with a fork $r_3$, which embraces a small friction wheel $s_2$. This latter is so mounted upon the axle $t$, that it can be shifted by the forked rod $r_2$ along the axle which is mounted in bearings $t_1$, $t_2$, but the wheel $s_2$ cannot be rotated with respect to the axle $t$. If $t$ is rotated the tooth wheel $u_1$ firmly connected to the axle $t$ is also rotated, thereby correspondingly operating the register $u$. The wheel $s_3$, by which the friction wheel $s_2$ is rotated, is constantly rotated by a clock work $v$.

The operation of the device shown is as follows. If any water is flowing through the restriction $e_1$, a certain suction will be produced in the shank $g_1$ of the tube $g$. The fluid contained in the tube which is normally, that is to say, if no water is flowing through the restricted portion $e_1$, in the zero-position $y$ $y$ in all the tube shanks, will rise in the shank $g_1$ to a certain height, thereby lowering the level in the shank $g_2$, and the piston $h$. The magnitude of suction and consequently the lowering and rising of the mercury levels depends on the velocity of the water flowing through the restriction. The variable motion of the piston $h$ is imparted to the point $c$ of the motion transformer and is transformed into a uniform motion of the point $d$, so that the toothed rod will correspondingly more or less change the location of the friction wheel upon the axle $t$. This wheel $s_2$ will therefore touch the disk $s_3$ nearer or farther away from the center of the disk $s_3$, so that the rotation of the axle $t$ and tooth wheel $u_1$ actionating the registering device $u$, will correspondingly vary thereby exactly registering the quantity of water, which has passed the restriction $e_1$. The second tube $k$ will act in the opposite way. If the water is flowing through the pipe $e$ a pressure will be exerted upon the mercury level in the shank $k_1$ this pressure and the alteration of the position of piston $l$ will depend on a certain mathematical law. The variable motion of $l$ is transformed by means of the motion transformer into a uniform motion of $p$ which is transferred to the tooth wheel $s_1$.

The described device may be simplified in many respects. In certain cases it would be sufficient to employ one motion transformer only. Instead of using a quadrangular link joint such a one having two links only could be used. For instance, in the motion transformer shown, the links $a_1$ and $a_4$ and the guide $b_1$ could be spared, by providing for special guides $z_1$ and $z_2$ for the link ends $c$ and $d$, as shown in Fig. 2.

Having now described my invention what I claim and desire to secure by Letters Patent is:

1. Device for transforming a motion variable according to a mathematical function into a uniform motion and for registering the latter comprising an element for producing variable motion, an element for registering uniform motion, a transformer consisting of a link movement having one end suitably guided and connected with the element of uniform motion and the other end suitably guided and connected with the element of variable motion and also having an intermediate joint, and means for guiding said intermediate joint in the path corresponding with the change in motion required.

2. Device for transforming a motion variable according to a mathematical function into a uniform motion, and for registering the latter, comprising an element for producing variable motion, an element for registering uniform motion, a transformer consisting of a jointed linkage connecting said elements of uniform and variable motion, means for guiding the end of the link connected to the element of variable motion, means for guiding the end of the link connected to the element for registering uniform motion, and means for guiding the other ends hinged together in a path corresponding with the change in motion required, to transform the variable motion into the uniform motion.

3. Device for transforming a motion variable according to a mathematical function into a uniform motion and for registering the latter, comprising a transformer having a jointed linkage and a curved guide suitably shaped to guide the hinged ends of said jointed linkage to cause the variable motion of a point of one link to be transformed into a uniform motion of a second link; a water meter arrangement working on the Venturi principle and imparting to the said point of the first link the variable motion; and means for registering the uniform motion of the above mentioned second link of the transformer, substantially as described.

4. Device for transforming a motion variable according to a mathematical function into a uniform motion and for registering the latter, comprising a transformer, having a jointed linkage and a curved guide suitably shaped to guide the hinged ends of said jointed linkage to cause the variable motion of a point of one link to be transformed into a uniform motion of a point of a second link; a tube having two shanks and containing a liquid, the alterations in height of one level of said liquid, caused by the alterations in height of the other liquid level, being imparted to the first mentioned link of the motion transformer; and means for registering the uniform motion of the above mentioned second link of the transformer, substantially as described.

5. Device for transforming a motion variable according to a mathematical function into a uniform motion and for registering the latter, comprising a motion transformer having a jointed linkage and a curved guide suitably shaped to guide the hinged ends of said jointed linkage to cause the variable motion of a point of one link to be transformed into a uniform motion of a second link; a tube having two shanks and containing a liquid, the one shank opening into the restricted portion of a fluid conduit, so that the level height of the liquid level in this shank is influenced by the fluid pressure present at said restriction; means for imparting the alterations in height of the other liquid level of the tube, to a point of one link of said transformer, and means for registering the produced uniform motion of a second link of said transformer, substantially as described.

6. Device for transforming a motion variable according to a mathematical function into a uniform motion and for registering the latter, comprising two motion transformers each having a jointed linkage and a curved guide suitably shaped to guide the hinged ends of said jointed linkage to cause the variable motion of a point of one link to be transformed into a uniform motion of a second link; a tube having two shanks containing a liquid, the one shank opening into a restricted portion of a fluid conduit; means for imparting the alterations in height of the other liquid level of the tube, to a link point of one of both transformers; a second tube having two shanks containing a liquid, the one shank of this tube opening into said fluid conduit before but near said restricted portion; means for imparting the alteration in height of the other liquid level of this tube, to a link point of the second transformer; and means for registering the uniform motion produced at one point of each transformer, thereby registering the quantity of fluid passed through the restricted portion of said fluid conduit, substantially as described.

In witness whereof, I hereunto subscribe my name this first day of March, A. D. 1907.

HENRI NIEBUHR.

Witnesses:
P. R. THOMPSON,
JAMES M. BOWCOCK.